(12) United States Patent
Ibrahim et al.

(10) Patent No.: US 7,986,786 B2
(45) Date of Patent: *Jul. 26, 2011

(54) METHODS AND SYSTEMS FOR UTILIZING CRYPTOGRAPHIC FUNCTIONS OF A CRYPTOGRAPHIC CO-PROCESSOR

(75) Inventors: Wael M. Ibrahim, Cypress, TX (US); Graeme J. Proudler, Bristol (GB); Liqun Chen, Bristol (GB); Manuel Novoa, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1144 days.

This patent is subject to a terminal disclaimer.

(21) Appl. No.: 11/565,075

(22) Filed: Nov. 30, 2006

(65) Prior Publication Data
US 2008/0130893 A1 Jun. 5, 2008

(51) Int. Cl.
*H04L 9/00* (2006.01)
(52) U.S. Cl. .......... 380/277; 713/189; 713/193; 726/10; 726/14; 726/15

(58) Field of Classification Search ............... 713/189, 713/193; 380/277; 726/10–15
See application file for complete search history.

(56) References Cited

U.S. PATENT DOCUMENTS

| | | | | |
|---|---|---|---|---|
| 6,138,239 A * | 10/2000 | Veil | | 726/10 |
| 6,324,644 B1 * | 11/2001 | Rakavy et al. | | 713/1 |
| 2002/0188856 A1 * | 12/2002 | Worby | | 713/193 |
| 2003/0037244 A1 * | 2/2003 | Goodman et al. | | 713/189 |
| 2003/0097583 A1 * | 5/2003 | Lacan et al. | | 713/200 |
| 2005/0111664 A1 * | 5/2005 | Ritz et al. | | 380/255 |
| 2005/0138345 A1 * | 6/2005 | Cromer et al. | | 713/2 |
| 2006/0059363 A1 * | 3/2006 | Mese et al. | | 713/185 |
| 2006/0101286 A1 * | 5/2006 | Catherman et al. | | 713/193 |
| 2006/0259782 A1 * | 11/2006 | Wang et al. | | 713/189 |
| 2007/0056033 A1 * | 3/2007 | Grawrock | | 726/15 |
| 2007/0101156 A1 * | 5/2007 | Novoa et al. | | 713/190 |

* cited by examiner

*Primary Examiner* — Taghi Arani
*Assistant Examiner* — Amir Mehrmanesh

(57) ABSTRACT

A computer platform is provided that comprises a processor and a cryptographic co-processor coupled to the processor. The computer platform further comprises a platform entity coupled to the processor. The platform entity establishes a secure relationship with the cryptographic co-processor that enables the platform entity to utilize cryptographic functions provided by the cryptographic co-processor.

22 Claims, 4 Drawing Sheets

METHODS AND SYSTEMS FOR UTILIZING CRYPTOGRAPHIC FUNCTIONS OF A CRYPTOGRAPHIC CO-PROCESSOR

BACKGROUND

Cryptographic co-processors can perform several functions such as generating encryption keys, storing secrets, encrypting data, decrypting data, signing data, verifying signatures or other functions. One particular function of a cryptographic processor may be to perform symmetric algorithm encryption and decryption. In other words, the same key is used to encrypt and to decrypt a message. Due to the security concerns of various countries, there are governmental restrictions regarding the importation/exportation of cryptographic processors that perform symmetric key encryption and decryption. In recent years, the Trusted Computing Group (TCG) designed the Trusted Platform Module (TPM) to perform certain cryptographic functions without violating these restrictions. For example, the TPM is designed not to export a symmetric encryption/decryption function.

Access to cryptographic functions can provide benefits to various entities of a computing platform. For example, a Basic Input/Output System (BIOS) could implement digital signature verification to ensure a BIOS flash image is authentic. Also, a BIOS could implement an RSA algorithm to wrap a symmetric key for securely exchanging the symmetric key between the BIOS and an operating system component. Also, a BIOS could implement symmetric key encryption and decryption to securely encrypt and decrypt data transferred between the BIOS and an operating system. Configuring a BIOS (or other entity) to perform cryptographic functions such as those described above increases the size of the BIOS code and requires the ability to store secrets. Thus, a larger and more expensive flash memory is needed to store the BIOS image and protected non-volatile storage is needed to store secrets. It would be desirable if a BIOS (or other platform entity) could utilize the TPM's cryptographic functions without violating existing governmental import/export restrictions.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the invention enable platform entities such as a Basic Input/Output System (BIOS) to selectively utilize the cryptographic functions of a cryptographic co-processor such as the Trusted Platform Module (TPM). For example, a platform BIOS may utilize the digital signature verification function of the TPM to ensure a BIOS flash image is authentic. Also, a platform BIOS may utilize the RSA algorithm of the TPM to wrap a symmetric key for securely exchanging the symmetric key between the BIOS and an operating system component. Also, a platform BIOS may utilize the symmetric key encryption and decryption of the TPM to securely encrypt and decrypt data transferred between the BIOS and an operating system. To ensure the TPM's cryptographic functions are accessible only to authorized entities, embodiments of the invention implement at least one authentication scheme. If a platform entity or a platform entity's command is successfully authenticated, the TPM's cryptographic functions are made available to the platform entity. If authentication fails, the TPM's cryptographic functions are not available to the platform entity. In at least some embodiments, different TPM functions are selectively available to different platform entities. Thus, after successful authentication, a platform entity may be authorized to utilize some TPM functions but not others.

Figure 1:
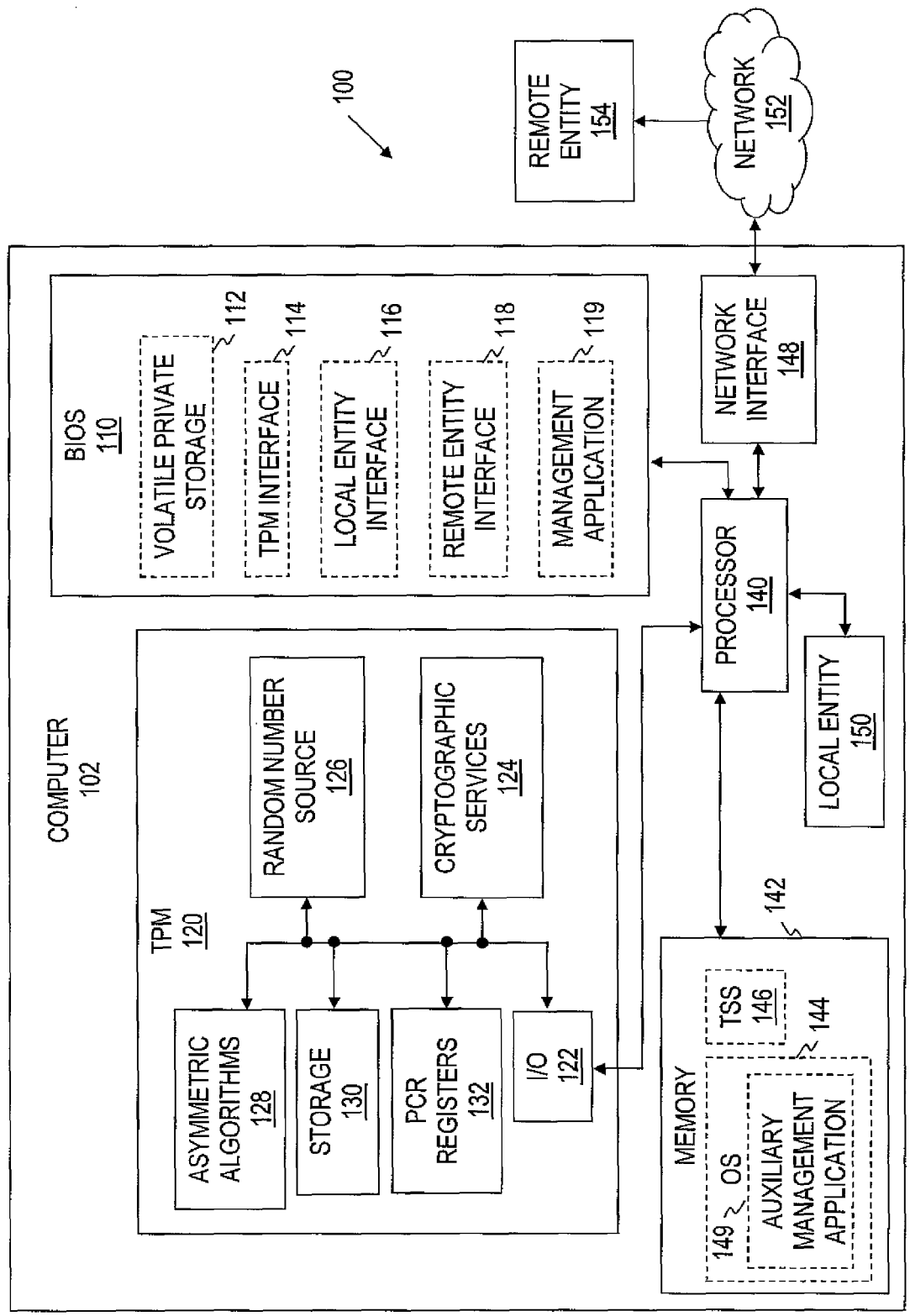
FIG. 1 shows a system in accordance with embodiments of the invention.

FIG. 1 shows a system 100 in accordance with embodiments of the invention. As shown in FIG. 1, the system 100 comprises a computer 102 coupled to at least one remote entity 154 via a network 152. The computer 102 may be, for example, a server, a desktop computer, a laptop computer or a mobile device. The computer 102 comprises a processor 140 coupled to at least one local entity 150. As used herein "local entities" refer to hardware/firmware/software entities that are internal to the computer 102 and "remote entities" refer to hardware/firmware/software entities that are external to the computer 102. Examples of local entities include but are not limited to an Operating System and peripherals such as a smartcard reader, a hard disk drive, network controller, and a graphics controller. Examples of remote entities include but are not limited to a server that provides BIOS upgrades or a peer computer that requests information regarding the BIOS's version.

As shown, the processor 140 couples to a network interface 148. The network interface 144 may take the form of modems, modem banks, Ethernet cards, Universal Serial Bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, or other network interfaces. Via the network interface 148, the processor 140 is able to connect to and communicate with the network 152 which may represent the Internet, Local Area Network (LANs) or Wide Area Network (WANs). With such a network connection, it is contemplated that the BIOS 110 (via the processor 140) might receive information from the network, or might output information to the network in the course of communicating with the remote entity 154.

As shown in FIG. 1, the processor 140 also has access to a Basic Input/Output System (BIOS) 110 which may be implemented, for example, as part of a chipset (e.g., a "Southbridge") or other module. As will later be described, embodiments enable the BIOS 110 (or another platform entity) to securely communicate with the local entity 150 and/or the remote entity 154.

The processor 140 also couples to a memory 142 which stores an operating system (OS) 144 for the computer 102. As shown, the memory 142 may also store a Trusted Platform Module Software Stack 146 (TSS) which handles requests sent to a Trusted Platform Module (TPM) 120 coupled to the processor 140.

The TPM 120 is configured to provide cryptographic functions such as an RSA asymmetric algorithm for digital signature and for encryption, SHA-1 hashing, a Hash-based Message Authentication Code (HMAC) function, secure storage, random number generation, or other functions The TPM 120 is implemented using software, firmware and/or hardware. The TPM components shown in FIG. 1 have been generalized and are not all-inclusive. Also, TPM architectures and functions may possibly change over time as authorized by the Trusted Computing Group (TCG).

As shown in FIG. 1, the TPM 120 comprises an input/output (I/O) interface 122 in communication with the processor 140. The I/O interface 122 couples to other TPM components such as cryptographic services 124, a random number source 126, asymmetric algorithms 128, storage 130 and Platform Configuration Registers (PCRs) 132. The cryptographic services 124 support functions such as hashing, digital signing, encryption and decryption. The random number source 126 generates random numbers for the cryptographic services 124. For example, in some embodiments, the cryptographic services 124 use random numbers to generate encryption keys. The asymmetric algorithms 128 enable the TPM 120 to perform asymmetric key operations. The storage 130 securely stores secrets (e.g., encryption keys or other data) protected by the TPM 120. The PCRs 132 store information about the current state of the computer 102. For example, in some embodiments, the PCRs 132 store individual integrity measurements related to the computer 102 as well as sequences of integrity measurements.

As shown in FIG. 1, the BIOS 110 comprises a TPM interface 114 as well as a local entity interface 116 and a remote entity interface 118. The BIOS 110 also comprises a volatile private storage 112 which can be used to store secrets such as One-Time Pad (OTP) data and/or a secret shared with the TPM 120 while the computer is active but not after power is removed. As described herein, the TPM interface 114 enables secure communications between the BIOS 110 and the TPM 120, while the management application 119 enables non-secure communications between the BIOS 110 and the TPM 120.

In at least some embodiments, the TPM interface 114 could involve a secured authentication scheme that, if successful, enables the BIOS 110 to selectively utilize cryptographic functions of the TPM 120 as well as non-volatile storage functions provided via the TPM 120. Upon successful authentication of the BIOS 110, the local entity interface 116 may utilize the cryptographic functions of the TPM 120 via the TPM interface 114 and the management application 119 to enable secure local communications between the BIOS 110 and the local entity 150. In at least some embodiments, the secure local communications are based on digital signatures (e.g., an RSA signature scheme). In other words, messages transferred between the BIOS 110 and the local entity 150 can be signed to indicate the source of the message. If a message transferred from the BIOS 110 to the local entity 150 (or vice versa) is not signed or the signature is invalid, the message is not trusted and is handled accordingly.

Similarly, upon successful authentication of the BIOS 110, the remote entity interface 118 may utilize the cryptographic functions of the TPM 120 to enable secure remote communications between the BIOS 110 and the remote entity 154. In at least some embodiments, the secure remote communications are based on anonymous digital signatures. In other words, messages transferred between the BIOS 110 and the remote entity 154 can be signed anonymously by the BIOS 110. In such case, the TPM 120 provides evidence that the source of the anonymous signature is trusted. For example, a Direct Anonymous Attestation (DM) signature scheme and/or a privacy certificate authority (privacy-CA) scheme can be implemented by the remote entity interface 118 as will later be described. If a message transferred from the BIOS 110 to the remote entity 154 (or vice versa) is not signed or the signature is invalid, the message is not trusted and is handled accordingly. In at least some embodiments, the local entity interface 116 utilizes a first set of TPM cryptographic functions for secure local communications while the remote entity interface 118 utilizes a second set of TPM cryptographic functions for secure remote communications.

As previously mentioned, platform entities other than the BIOS 110 may also benefit from secure communications with the local entity 150 and/or the remote entity 154. In some cases, a platform entity could be a local entity (e.g., a smart-card reader) that benefits from a secure communication channel with another local entity 150 or with the OS/system/BIOS. In at least some embodiments, the platform entity leverages the BIOS 110 as a broker to establish a secure communication channel with another local entity 150 and/or the remote entity 150. Accordingly, such platform entities could implement a TPM interface, a local entity interface, a remote entity interface and a management application in a manner similar to the TPM 114 interface, the local entity interface 116, the remote entity interface 118 and management application 119 of the BIOS 110. For convenience, only the BIOS 110 and the interfaces related to the BIOS 110 are described herein.

As previously mentioned, the TPM interface 114 supports at least one secure authentication scheme that enables the BIOS 110 to be authenticated before utilizing cryptographic functions of the TPM 120. For example, the secure authentication scheme could be based on "locality" and/or a shared secret known only to the BIOS 110 and the TPM 120. As used herein, locality refers to a mechanism provided by the platform to indicate that the source of a command is "local to the platform." For example, the locality mechanism may be based on a signal output from a memory management unit (MMU). In at least some embodiments, a hierarchy of "localities" can be supported.

The locality authentication scheme involves defining a new locality within the storage space of the TPM 120. Currently, five localities (localities 0-4) have been defined for giving certain devices and applications access to storage space within the TPM 120. The new locality (e.g., locality 5 or 6)

would be reserved for devices or applications that are authorized to access the TPM's cryptographic functions including the TPM's symmetric encryption and decryption functions. In some embodiments, the BIOS 110 is assigned to the new locality. As previously mentioned, other platform entities may benefit from utilizing the TPM's cryptographic functions (or non-volatile storage functions) and could be assigned to the same new locality as the BIOS 110 or to a different new locality. The TPM 120 is able to recognize commands from the BIOS 110 or other platform entities via a TCG locality modifier provided with incoming commands.

In at least some embodiments, storing BIOS secrets in non-volatile storage accessed via the TPM 120 involves a "sysSRK" storage key in the TPM 120. The sysSRK is congruent to the existing Storage Root Key (SRK). In at least some embodiments, the sysSRK is stored in the TPM's non-volatile secure memory and can be the root of a separate System Protected Storage (SPS) architecture. The BIOS 110 also may create other keys in the separate SPS hierarchy or in the normal TPM protected storage hierarchy. In either case, the keys may be stored as encrypted blobs based on the TCG specification. The BIOS 110 may store the encrypted blobs in any convenient memory location depending on specific requirements such as access to that location during specific periods of a platforms' boot cycle (e.g., access early in a boot cycle may be desired). In at least some embodiments, the sysSRK is available to the computer 102 regardless of whether the TPM 120 is owned, activated or enabled. With the sysSRK, the BIOS 110 can build a SPS hierarchy and store encrypted data with various types of access control. For example, a cryptographic HMAC challenge could be built using passwords, PCR registers and locality.

In at least some embodiments, the TPM 120 stores a value (referred to herein as the "sysAuth" value), which can be used to control resources in the TPM 120. For example, the sysAuth value could be used as a password in an HMAC cryptographic challenge to control resources in the TPM 120. In at least some embodiments, authorization to use the sysSRK is based on the sysAuth value. Additionally, authorization to use other keys stored in the sysSRK's protected Storage hierarchy may also be based on the sysAuth value.

The BIOS 110 could include a flag or data structure that indicates when there is no need to create a new sysSRK. For example, the flag may be asserted if a sysSRK was created in a previous boot cycle. To create a new sysSRK, the BIOS 110 sends a sysSRK creation command to the TPM 120. The sysSRK creation command can be authenticated by the TPM 120 based on the sysAuth value and/or locality. In either case, authorization protocols for the new sysSRK key are based on the sysAuth value.

In some embodiments, the sysAuth value is changed during each boot cycle of the computer 102. For example, the BIOS 110 could install a new sysAuth value in the TPM 120 during each boot cycle of the computer 102. During each boot cycle, the BIOS 110 has exclusive control of the computer 102 (i.e., no other programs are being executed on the computer 102) and is able to perform TPM initialization and to securely exchange data with the TPM 120. To install the sysAuth value in the TPM 120, the BIOS 110 sends a command to the TPM 120 that causes the TPM 120 to retrieve a random number from the random number source 126. The random number is then installed in the TPM 120 as the sysAuth value. The random number (i.e., the sysAuth value) is also sent by the TPM 120 to the BIOS 110, which stores the random number in the volatile private memory 112 which is preferably only accessible to the BIOS 110. In at least some embodiments, the volatile private memory 112 represents a System Management Mode (SMM) memory which stores the sysAuth value. In such case, the volatile private memory 112 could be located in the memory 142 but would not be accessible to the OS 144. During SMM mode, the BIOS 110 would have exclusive access to SMM memory used as the volatile private memory 112. In summary, the TPM 120 and the BIOS 110 treat the sysAuth value as a secret and do not reveal its value.

During the boot cycle, the BIOS 110 also sends a command to the TPM 120 to create One-Time Pad (OTP) data. This command causes the TPM 120 to obtain a random number value from the random number source 126 and to store the random number as OTP data. The random number (i.e., the OTP data) is also sent by the TPM 120 to the BIOS 110, which stores the OTP data in the volatile private memory 112. The TPM 120 and the BIOS 110 treat the OTP data as a secret and do not reveal its value.

Before passing sensitive data between the BIOS 110 and the TPM 120, the BIOS 110 may command the TPM 120 to start an OTP session. During the OTP session and prior to exporting data to the BIOS 110, the TPM 120 "XORs" sensitive data with the OTP data in the TPM's OTP storage. The OTP session provides a one-time encryption/decryption for passing sensitive data between the BIOS 110 and the TPM 120 via the OS 144. Upon receiving sensitive data from the TPM 120, the BIOS 110 "XORs" the data with OTP data stored in the volatile private storage 112 of the BIOS 110. The XOR operation enables the original sensitive data to be recovered. In the above example, sensitive data was passed from the TPM 120 to the BIOS 110 during an OTP session. In similar manner, sensitive data could be passed from the BIOS 110 to the TPM 120 during an OTP session. For example, OTP data could be used when exchanging sensitive data such as plain text data between the BIOS 110 and the TPM 120 via the management application 119 but not via the TPM interface 114. The TPM 120 and the BIOS 110 discard any OTP data after using it once.

In at least some embodiments, the BIOS 110 is able to block the installation of a new sysAuth value in the TPM 120. For example, after the sysAuth value has been installed and OTP data has been exchanged, the BIOS 110 may issue a command (referred to herein as the "sysLock" command) to prevent further changes to the sysAuth value. If sysLock is set to "1" or "True," a new sysAuth value cannot be installed in the TPM 120. If sysLock is set to "0" or "false," a sysAuth value can be installed in the TPM 120. If desired, the TPM 120 could set sysLock to false every time the TPM 120 is booted.

In at least some embodiments, the TPM keys and operations are modified to use the sysAuth value (rather than the auth value that is inserted into keys when they are created or modified by other TCG commands) for certain TPM authorization protocols. The auth value inserted into a key during creation or modification by other TCP commands could still be used to verify the integrity of keys loaded into the TPM 120. In such embodiments, a key creation command from the BIOS 110 may include a flag that directs the TPM 120 to create a key where the sysAuth value must be used as the HMAC secret in authorization protocols.

In at least some embodiments, TPM keys and operations are modified to enable keys based on symmetric cryptographic algorithms. In such embodiments, the TPM 120 does not use keys based on symmetric cryptographic algorithms unless the command is from the BIOS 110 (or other authorized platform entity) as indicated by locality or the shared sysAuth value (i.e., the shared secret). Also, in such embodiments, a key creation command from the BIOS 110 may cause the TPM 120 to create a symmetric key having a TPM_KEY structure where the pubKey value is NULL.

In at least some embodiments, TPM keys and operations are modified to permit keys to use asymmetric pubKeys whose privKeys are unknown. In such embodiments, a key creation command from the BIOS 110 may cause the TPM 120 to load an asymmetric key (e.g., using a submitted pubKey) having a TPM_KEY structure where the privKey value is NULL.

To indicate when a new asymmetric key is available within a predetermined amount of time, the TPM 120 may implement a flag (referred to herein as a "asymKeyAvailability" flag). If the asymKeyAvailability flag is "1" or "true," the TPM 120 can guarantee to return a new asymmetric key within a threshold amount of time.

Before the BIOS 110 creates a key using the TPM 120, the BIOS 110 may read the asymKeyAvailability flag from the TPM 120. If the TPM 120 indicates that an asymmetric key can be returned within a threshold amount of time (e.g., within a time period that enables the BIOS 110 to boot the OS 144 on schedule or within a time period in which the OS 144 can be suspended in SMM mode without adversely affecting the OS 144), the BIOS 110 may command the TPM 120 to create a key. If the TPM 120 indicates an asymmetric key cannot be returned within a threshold amount of time, the BIOS 110 may delay the key creation command until after the OS 144 has booted.

In at least some embodiments, an OS-resident application communicates with the BIOS 110 and the TSS 146 to manage interactions between the TPM 120 and the BIOS 110. For example, messages passed from the BIOS 110 to the TPM 120 can be properly scheduled with the TSS 146 by the OS-resident application. In this manner, the BIOS 110 does not need to pre-empt the OS 144 in order to access the TPM 120.

In at least some embodiments, a command from the BIOS 110 includes a flag (referred to herein as a "twoPhase" flag) that directs the TPM 120 to pass plain text data via a buffer that requires BIOS authorization to write or read. For example, the twoPhase flag can be used to improve the security of data encryption/decryption requests from the BIOS 110 to the TPM 120. In the case of data encryption, the BIOS 110 could pass plain text data to the TPM 120 via the TPM interface 114 which prevents other platform entities from viewing the plain text data. The plain text information is written into the TPM's buffer. The BIOS then executes a command that includes the twoPhase flag. In the first phase, the TPM 120 retrieves the plain text data from the TPM's buffer (rather than from the command's input parameters) and encrypts the data. In the second phase, the BIOS 110 sends a command to the TPM 120 to retrieve the encrypted data.

In the case of data decryption, the BIOS 110 could pass encrypted data to the TPM 120. The BIOS 110 then executes a command that includes the twoPhase flag. In the first phase, the TPM 120 decrypts the encrypted data and stores the plain text data in the TPM's buffer (rather than return the data as the command's return parameters). In the second phase, the BIOS 110 can read the plain text data from the TPM's buffer via the TPM interface 114 which prevents other platform entities from viewing the plain text data.

In one implementation of the two phase process, the TPM 120 may set a given General Purpose Input/Output (GPIO) to "1" or "true" when plain text data in the TPM's buffer is ready to be read by the BIOS 110. In such case, the computer 102 monitors the TPM's GPIO outputs and initiates SMM mode when the given GPIO is set to "1" or "true." During the SMM mode, the BIOS 110 issues another command directly to the TPM 120 to fetch the plain text data without involvement of the OS 144 or the TSS 146. The command issued during the SMM mode could also set the given GPIO output to "0" or "false." Other methods may be used to signal when the computer 102 should enter the SMM mode, including reception by the BIOS of a command with return parameters that include a twoPhase flag which is TRUE.

In some embodiments, the BIOS 110 uses existing TPM commands related to keys in a protected storage hierarchy. For example, the BIOS 110 may issue existing TPM commands for encrypting, decrypting, or signing based on asymmetric keys. Additionally or alternatively, the BIOS 110 may issue new or enhanced TPM commands that cause the TPM 120 to verify signatures, load an asymmetric key where the privKey is NULL, encrypt with a public key, create a symmetric key, encrypt with a symmetric key or decrypt with a symmetric key.

In at least some embodiments, the management application 119 passes messages between the BIOS 110 and other devices or applications. For example, the management application 119 may pass messages between the BIOS 110 and the OS 144, between the BIOS 110 and a peripheral device (e.g., a biometric reader), or between the BIOS 110 and the TPM 120. If desired, the management application 119 causes the computer 102 to enter a SMM mode during which the BIOS 110 executes and OS operations are halted.

In some embodiments, the management application 119 interacts with an auxiliary management application 149 which executes as a normal OS process. The auxiliary management application 149 contains a time and/or event driven scheduler that enables the auxiliary management application 149 to pass data to the management application 119 (by placing data in memory that is accessible to both the OS and the BIOS, for example) and then trigger SMM mode. For example, the data may be an indication that a new BIOS image has been received and requires verification. Alternatively, the data may be the results from a previously executed TPM command requested by the BIOS. In response to a triggered SMM mode, the BIOS 110 may read data in the shared memory, perform any necessary actions, write response data to the shared memory, and then terminate SMM mode. The auxiliary management application 149 then reads data from the shared memory and performs any necessary actions. For example, the data read by the auxiliary management application 149 may describe a TPM command to be executed on behalf of the BIOS 110.

When the BIOS 110 interacts with the TPM 120, the management application 119 causes the BIOS 110 to perform authorization protocols and data assembly necessary for communicating with the TPM 120. For example, the BIOS 110 may copy a message for the TPM 120 to a buffer which the auxiliary management application 149 can access. If a TSS 146 is present and operational, the auxiliary management application 149 sends data from the buffer to the TSS 146. The TSS 146 then schedules the presentation of the data to the TPM 120. In this manner, the amount of time during which the BIOS 110 is executing (and during which the OS 144 ceases executing) is minimized or reduced. If no TSS 146 is present or operational, but an OS 144 is present, the management application 119 acts as a TSS to minimize the time during which the BIOS 110 is executing.

In at least some embodiments, the local entity 150 and the remote entity 154 are able to register public keys or encrypted symmetric keys with the BIOS 110. Based on the registration, the BIOS 110 maintains a data structure (e.g., a table) with the entities and any associated public keys or encrypted symmetric keys. For example, keys may be loaded on the computer 102 by the local entity 150 or the remote entity 154. Additionally or alternatively, keys may be created on the computer 102 by the local entity 150, the remote entity 154 or the BIOS 110. If a key is created on the computer 102 by the local entity 150 or the remote entity 154, appropriate authorization schemes can be implemented to load or use the key on the computer 102. For example, an authorization scheme can verify that a given local entity 150 or remote entity 154 is "on-line" or operational before a key can be loaded or used on the computer 102.

In at least some embodiments, the BIOS 110 cryptographically verifies messages sent to the BIOS 110. For example, messages sent to the BIOS 110 may have a signature value computed with a private key that matches a public key registered with the BIOS 110. If the auxiliary management application 149 receives an indication that a message should be sent to the BIOS 110, the BIOS 110 identifies the relevant public key from its table and loads the public key in the TPM 120. The BIOS 110 then uses the TPM 120 as a cryptographic co-processor to verify the signature on the message. Once the message has been verified, the BIOS 110 performs the action requested by the message. For example, the message may be to reflash the BIOS image. In such case, the message could include new BIOS image. Alternatively, the message may be a command to assert Physical Presence at the TPM 120. As described in TCG specifications, Physical Presence is normally an indication that a TPM command has been authorized by a person with physical access to the platform. In this case, however, Physical Presence is modified to become an indication that a TPM command has been authorized by a local entity 150 or remote entity 154 that is registered with the BIOS 110.

In at least some embodiments, the BIOS 110 decrypts messages sent to the BIOS 110. These messages may include encrypted data computed with a key that matches with a local entity 150 or remote entity 154 registered with the BIOS 110. When the auxiliary management application receives an indication that a message should be sent to the BIOS 110, the BIOS 110 identifies the relevant key from its table and loads the given asymmetric key or symmetric key in the TPM 120. The BIOS 110 then cooperates with the local entity 150 or remote entity 154 and uses the TPM 120 as a cryptographic co-processor to decrypt data in the message. Once the data is decrypted, the BIOS 110 performs a relevant action such as passing a secret to a component of the computer 102. For example, the BIOS 110 may receive an encrypted drive-lock password and pass the decrypted password to a hard drive of the computer 102. In at least some embodiments, a message decrypted based on symmetric encryption may also serve to authenticate the source of the message. For example, a symmetrically encrypted message from a biometric reader may serve to both pass information from the biometric reader and to verify to the BIOS 110 that the message came from the biometric reader.

Also, the BIOS 110 may encrypt messages sent from the BIOS 110. These messages may include encrypted data computed with a key that matches with a local entity 150 or remote entity 154 registered with the BIOS 110. When the auxiliary management application 149 receives an indication that a message should be sent from the BIOS 110, the BIOS 110 identifies the relevant key and loads the given asymmetric key or symmetric key in the TPM 120. The BIOS 110 then cooperates with the local entity 150 or remote entity 154 and uses the TPM 120 as a cryptographic co-processor to encrypt data in the message. Once the data is encrypted, the auxiliary management application 149 copies the outgoing message to a buffer for communication and the platform sends the encrypted message from the buffer to the local entity 150 or remote entity 154. For example, the BIOS 110 may send an encrypted password to the OS 144.

In at least some embodiments, the BIOS 110 cryptographically verifies messages sent to the BIOS 110. For example, messages sent to the BIOS 110 may have a signature value computed with a private key that matches a public key registered with the BIOS 110. In some embodiments, the local entity 150 or the remote entity 154 loads a given public key in the TPM 120. If the management application 119 receives an indication that a message should be sent to the BIOS 110, the message is copied to the BIOS's buffer and the computer 102 enters an SMM mode. The BIOS 110 then uses the TPM 120 as a cryptographic co-processor to verify the signature on the message. Once the message has been verified, the BIOS 110 performs the action requested by the message. For example, the message may be to reflash the BIOS image. In such case, the message could include new BIOS image. Alternatively, the message may be a command to assert Physical Presence at the TPM 120.

In at least some embodiments, the BIOS 110 decrypts messages sent to the BIOS 110. These messages may include encrypted data computed with a key that matches with the local entity 150 or the remote entity 154 registered with the BIOS 110. For example, the local entity 150 or the remote entity 154 may load a given asymmetric key or symmetric key in the TPM 120. When the management application 119 receives an indication that a message should be sent to the BIOS 110, the message is copied to the BIOS's buffer and the computer 102 enters the SMM mode. The BIOS 110 then cooperates with the local entity 150 or the remote entity 154 and uses the TPM 120 as a cryptographic co-processor to decrypt data in the message. Once the data is decrypted, the BIOS 110 performs an action such as passing a secret to a component of the computer 102. For example, the BIOS 110 may receive an encrypted drive-lock password and pass the decrypted password to a hard drive of the computer 102.

In at least some embodiments, a message decrypted based on symmetric encryption may also serve to authenticate the source of the message. For example, a symmetrically encrypted message from a biometric reader may serve to both pass information from the biometric reader and to verify to the BIOS 110 that the message came from the biometric reader.

In at least some embodiments, the BIOS 110 encrypts messages sent from the BIOS 110. These messages may include encrypted data computed with a key that matches with the local entity 150 or the remote entity 154 registered with the BIOS 110. For example, the local entity 150 or the remote entity 154 may load a given asymmetric key or symmetric key in the TPM 120. When the management application 119 receives an indication that a message should be sent from the BIOS 110, the computer 102 enters the SMM mode. The BIOS 110 then cooperates with the local entity 150 or the remote entity 154 and uses the TPM 120 as a cryptographic co-processor to encrypt data in the message. Once the data is encrypted, the BIOS 110 copies the outgoing message to a buffer for communication with the management application 119. The management application 119 sends the encrypted message from the buffer to the local entity 150 or the remote entity 154. For example, the BIOS 110 may send an encrypted password to the OS 144.

As previously mentioned, the remote entity interface 118 enables secure remote communications between the BIOS 110 and the remote entity 154. Similar to secure local communications, secure remote communications can be based on digital signatures. If a signature scheme such as an RSA engine were to be implemented for the secure remote communications, signatures from the BIOS 110 would disclose the identity (included in the public verification key) of the BIOS 110. To prevent remote disclosure of the BIOS identity, the remote entity interface 118 uses an anonymous signature scheme such as a Direct Anonymous Attestation (DM) signature scheme and/or a privacy certificate authority (privacy-CA) scheme.

In the DAA signature scheme, a signed message is formatted as a concatenation of two values, b and M, where b is a byte and M is a signed data string. In at least some embodiments, a new b value (e.g., b=2) is used with DAA signatures. If the new b value is concatenated with a signed message M, the TPM 120 verifies that the signed message M is from the BIOS 110 before the message is sent out to the remote entity 154. The TPM 120 can verify the signed message M is from the BIOS 110 based on, for example, locality or a shared secret. Upon successful verification, the signed message M with the new b value is sent out to the remote entity 154. When the remote entity 154 receives a DM signature with the new b value, the remote entity 154 accepts that the signed message M is from the BIOS 110.

When DM signatures are implemented, the OS 144 is unable to manipulate the signed message M, but does collaborate with the TPM 120 to act as a DM signer. Accordingly, the OS 144 could reveal information about the platform identity by appending unique platform information to an outgoing message. In at least some embodiments, the OS 144 is presumed to protect the privacy of the computer 102.

Instead of DM signatures, a privacy-CA scheme could be implemented to prevent remote disclosure of the BIOS identity. In the privacy-CA scheme, the TPM 120 uses an attestation identity key (AIK) to indicate that a signed message was issued by the BIOS 110. In other words, the TPM 120 creates a signature (e.g., an RSA signature) on a message from the BIOS 110 based on a key that can be verified via a privacy-CA certificate. The TPM 120 then performs a new command to sign the message using an AIK to provide evidence that the message was verified by the TPM 120 as coming from the BIOS 110. In at least some embodiments, a certified key chain is used if the signing key is not the AIK. In such case, the signing key could be certified by the AIK or by an AIK certified key.

In some embodiments, the BIOS 110 and the remote entity 154 could establish a secure communication session based on a shared secret. Accordingly, the BIOS 110 could issue a message to perform a key agreement process. At the end of the key agreement process, the BIOS 110 and the remote entity 154 will share a secret session key. For example, the mechanisms specified in ISO/IEC 11770 could be implemented for the key agreement process.

The increased security provided by anonymous signature schemes such as the DM signature scheme and/or the privacy-CA scheme need not be implemented for all communications from the BIOS 110. For example, in some embodiments, the anonymous signature scheme is only implemented if the BIOS 110 is communicating with the remote entity 154. Thus, the anonymous signature scheme protects the unique identity of the BIOS 110 outside of the computer 102. If the BIOS 110 is communicating with the local entity 150, a signature scheme that reveals the unique identity of the BIOS 110 (e.g., an RSA signature scheme) could be used.

Figure 2:
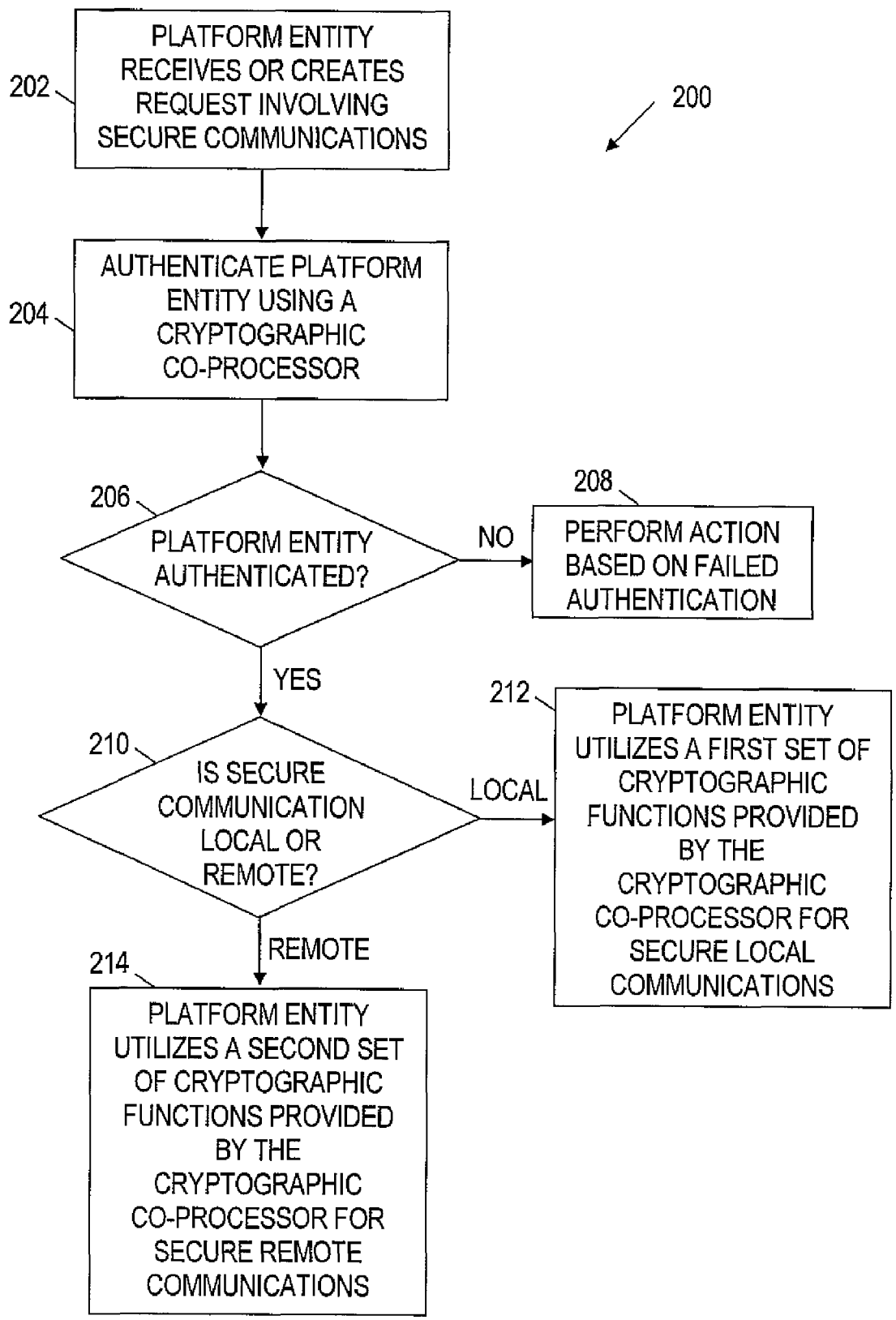
FIG. 2 shows a method in accordance with embodiments of the invention.

FIG. 2 shows a method 200 in accordance with embodiments of the invention. As shown in FIG. 2, the method 200 comprises a platform entity receiving or creating a request involving secure communications (block 202). For example, the platform entity could be a BIOS or other platform entity. The method 200 continues by authenticating the platform entity using a cryptographic co-processor (block 204). In at least some embodiments, the cryptographic co-processor is a TPM that authenticates the platform entity based on locality and/or a secret shared by the platform entity and the cryptographic co-processor. If the platform is not authenticated (determination block 206), an action is performed based on the failed authentication (block 208). For example, the cryptographic co-processor could notify an owner that an attempt to authenticate the platform entity failed.

If the platform is authenticated (determination block 206), the method 200 determines whether the secure communication is local or remote at block 210. If the secure communication is local (determination block 210), the platform entity utilizes a first set of cryptographic functions provided by the cryptographic co-processor for secure local communications (block 212). For example, the platform entity may utilize a signature scheme (e.g., RSA signatures) provided by the cryptographic co-processor for secure local communications. If the secure communication is remote (determination block 210), the platform entity utilizes a second set of cryptographic functions provided by the cryptographic co-processor for secure remote communications (block 214). For example, the platform entity may utilize an anonymous signature scheme (e.g., a DM signature scheme or a privacy-CA scheme) provided by the cryptographic co-processor for secure remote communications. Accordingly, the method 200 may expose the identity of the platform entity during secure local communications, but protects the identity of the platform entity during secure remote communications.

Figure 3:
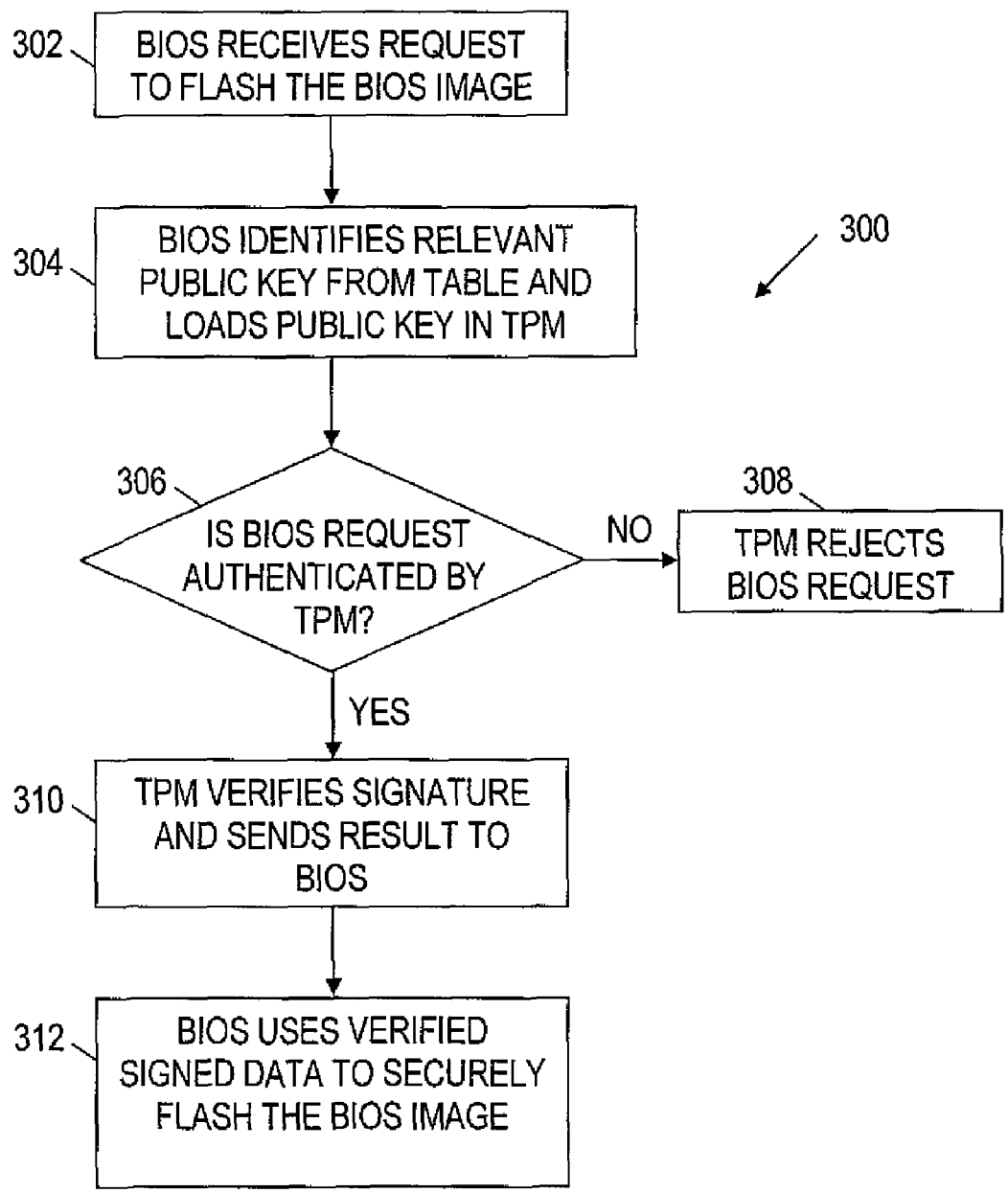
FIG. 3 shows another method in accordance with embodiments of the invention.

FIG. 3 shows another method 300 in accordance with embodiments of the invention. As shown in FIG. 3, the method 300 comprises a BIOS receiving a request to flash the BIOS image (block 302). In response, the BIOS identifies the relevant public key from a table and loads the public key in the TPM (block 304). If the request by the BIOS is not authenticated by the TPM (determination block 306), the TPM rejects the request (block 308). For example, the request from the BIOS can be authenticated based on locality and/or a secret shared by the BIOS and the TPM. If the request by the BIOS is authenticated by the TPM (determination block 306), the TPM verifies the signature on the message and sends the result to the BIOS (block 310). Finally, the BIOS uses the verified signed data to securely flash the BIOS image (block 312).

Figure 4:
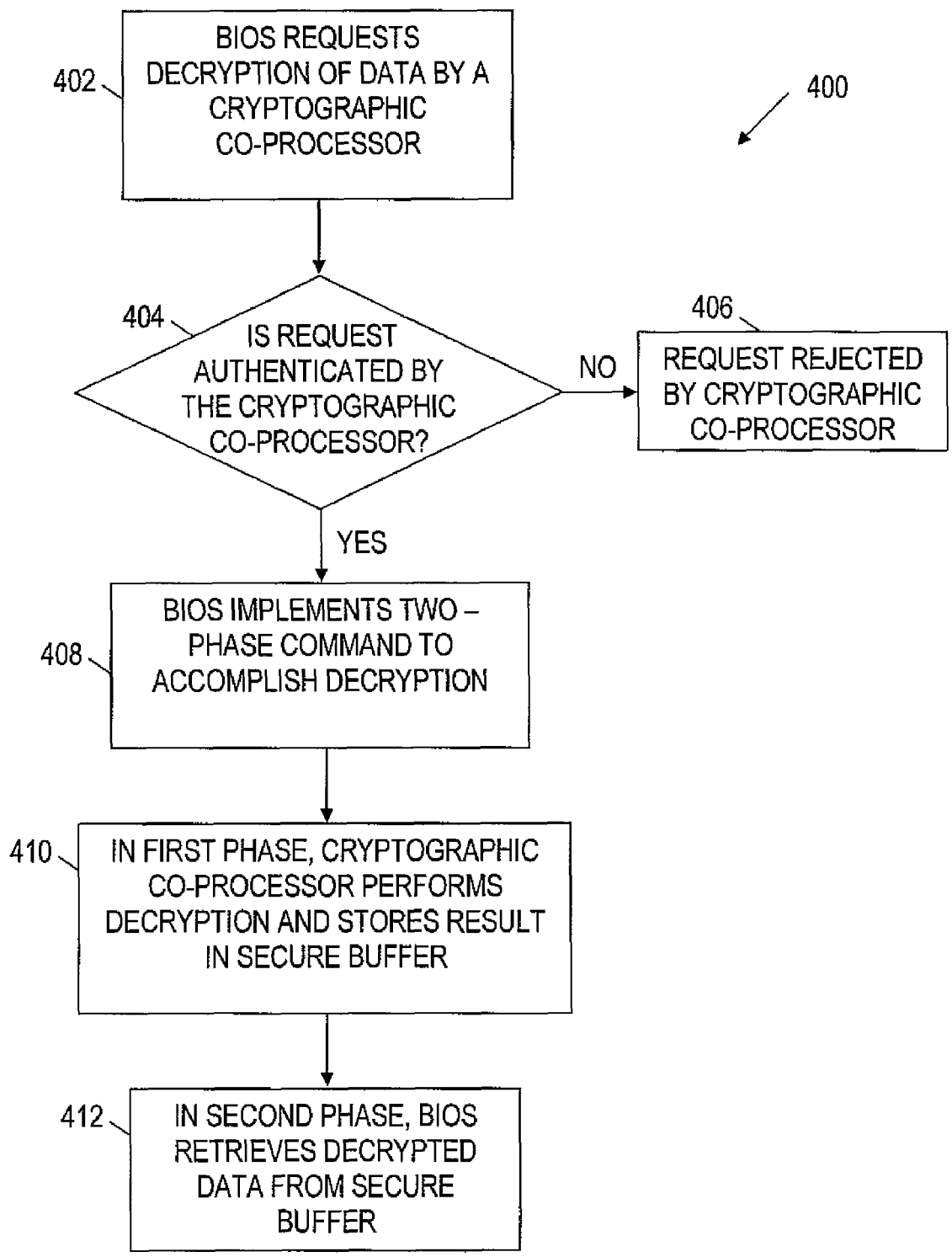
FIG. 4 shows another method in accordance with embodiments of the invention.

FIG. 4 shows another method 400 in accordance with embodiments of the invention. As shown in FIG. 4, the method 400 comprises BIOS requesting decryption of data by a cryptographic co-processor (block 402). If the decryption request is not authenticated by the cryptographic co-processor (determination block 404), the request is rejected by the cryptographic co-processor (block 406). In at least some embodiments, the cryptographic co-processor authenticates the request based on locality and/or a secret shared by the BIOS and the cryptographic co-processor. If the decryption request is authenticated by the cryptographic co-processor (determination block 404), the BIOS implements a two-phase command to accomplish decryption (block 408). In the first phase, the cryptographic co-processor performs decryption and stores the result in a secure buffer (block 410). For example, the secure buffer can be shared by the cryptographic co-processor and the BIOS. In the second phase, the BIOS retrieves the decrypted data from the secure buffer (block 412).

The above discussion is meant to be illustrative of the principles and various embodiments of the present invention.

Numerous variations and modifications will become apparent to those skilled in the art once the above disclosure is fully appreciated. It is intended that the following claims be interpreted to embrace all such variations and modifications.

What is claimed is:

1. A computer platform, comprising:
   a processor;
   a cryptographic co-processor coupled to the processor; and
   a platform entity coupled to the processor,
   wherein the platform entity is configured to establish a secure relationship with the cryptographic co-processor and, if the secure relationship is successfully established, to utilize cryptographic functions provided by the cryptographic co-processor for communications with another entity,
   wherein the platform entity is a Basic Input/Output System (BIOS) and the cryptographic co-processor is a Trusted Platform Module (TPM),
   wherein, if the BIOS communicates with a remote entity, the BIOS is authorized to utilize a first set of cryptographic functions provided by the cryptographic co-processor, the first set comprising an anonymous signature scheme that prevents disclosure of the BIOS's identity to the remote entity.

2. The computer platform of claim 1 wherein the BIOS establishes a secure relationship with the cryptographic co-processor based on locality.

3. The computer platform of claim 1 wherein the BIOS establishes a secure relationship with the cryptographic co-processor based on a secret shared by the BIOS and the cryptographic co-processor.

4. The computer platform of claim 1 wherein, if the BIOS communicates with a local entity, the BIOS is authorized to utilize a second set of cryptographic functions provided by the cryptographic co-processor, the second set of cryptographic functions comprising a signature scheme that discloses an identity of the BIOS to the local entity.

5. The computer platform of claim 1 wherein the cryptographic co-processor selectively provides symmetric cryptographic functions to the BIOS.

6. The computer platform of claim 1 wherein the BIOS selectively flashes a BIOS image based on a determination of signature veracity received from the cryptographic co-processor.

7. The computer platform of claim 1 wherein the BIOS utilizes the cryptographic co-processor to wrap a symmetric encryption key for secure transfer of the symmetric encryption key to another entity.

8. The computer platform of claim 1 wherein the BIOS utilizes symmetric key encryption and decryption provided by the cryptographic co-processor for communications between the BIOS and an operating system (OS) of the computer platform.

9. The computer platform of claim 1 wherein the BIOS requests data encryption by the cryptographic co-processor using a two-phase command in which, during a first phase, the cryptographic co-processor retrieves plain text data from a secure buffer accessible to the BIOS and encrypts the plain text data and, during a second phase, the BIOS retrieves the encrypted data from the cryptographic co-processor.

10. The computer platform of claim 1 wherein the BIOS requests data decryption by the cryptographic co-processor using a two-phase command in which, during a first phase, the cryptographic co-processor decrypts data and stores the decrypted data in a secure buffer accessible to the BIOS and, during a second phase, the BIOS retrieves the decrypted data from the secure buffer.

11. The computer platform of claim 1 wherein, during each boot cycle, the TPM stores an authorization value ("sysAuth") that is used as a password in a Hash-based Message Authentication Code (HMAC) cryptographic challenge to control cryptographic functions of the TPM.

12. The computer platform of claim 11 wherein the BIOS can block installation of a new authorization value ("sysAuth") in the TPM.

13. The computer platform of claim 1 wherein, during a boot cycle, the TPM stores a Storage Root Key that enables the BIOS to utilize cryptographic functions of the TPM regardless of whether the TPM is owned, activated or enabled.

14. The computer platform of claim 13 wherein the BIOS can block creation of a new Storage Root Key.

15. The computer platform of claim 1 wherein the cryptographic co-processor comprises a Trusted Platform Module (TPM) and wherein the BIOS causes the TPM to create a symmetric encryption key having a TPM_KEY structure where the pubKey value is NULL.

16. The computer platform of claim 1 wherein the cryptographic co-processor comprises a Trusted Platform Module (TPM) and wherein the BIOS causes the TPM to load an asymmetric encryption key having a TPM_KEY structure where the privKey value is NULL.

17. The computer platform of claim 1 wherein the cryptographic co-processor comprises a Trusted Platform Module (TPM) and wherein, if the BIOS requests an asymmetric encryption key, the TPM indicates whether the requested asymmetric encryption key can be returned to the BIOS within a predetermined amount of time.

18. A method, comprising:
    authenticating a platform entity using a cryptographic co-processor, wherein the platform entity is a Basic Input/Output System (BIOS) and the cryptographic co-processor is a Trusted Platform Module (TPM);
    if the authentication is successful, enabling the platform entity to utilize cryptographic functions of the cryptographic co-processor for communications with another entity;
    determining if the BIOS intends to communicate with a remote entity; and
    if the BIOS intends to communicate with a remote entity, enabling the BIOS to utilize an anonymous signature scheme of the cryptographic co-processor the anonymous signature scheme preventing disclosure of the BIOS's identity to the remote entity.

19. The method of claim 18 further comprising:
    determining if the BIOS intends to communicate with a local entity; and
    if the BIOS intends to communicate with a local entity, enabling the BIOS to utilize a signature scheme of the cryptographic co-processor, the signature scheme disclosing an identity of the BIOS to the local entity.

20. The method of claim 18 further comprising receiving, by the cryptographic co-processor, a two-phase data decryption request from the BIOS.

21. The method of claim 18 further comprising receiving, by the cryptographic co-processor, a two-phase encryption request from the BIOS.

22. The method of claim 18 further comprising selectively enabling the BIOS to utilize symmetric key encryption and decryption functions of the cryptographic co-processor for communications with an operating system (OS).

* * * * *

UNITED STATES PATENT AND TRADEMARK OFFICE
CERTIFICATE OF CORRECTION

| | | |
|---|---|---|
| PATENT NO. | : 7,986,786 B2 | Page 1 of 1 |
| APPLICATION NO. | : 11/565075 | |
| DATED | : July 26, 2011 | |
| INVENTOR(S) | : Ibrahim et al. | |

It is certified that error appears in the above-identified patent and that said Letters Patent is hereby corrected as shown below:

In column 14, line 45, in Claim 18, delete "co-processor" and insert -- co-processor, --, therefor.

Signed and Sealed this
Fourteenth Day of February, 2012

David J. Kappos
*Director of the United States Patent and Trademark Office*